Sept. 12, 1950     G. E. SORENSEN     2,521,759
REVERSIBLE MOTION TRANSMITTING MECHANISM
Filed Jan. 5, 1946
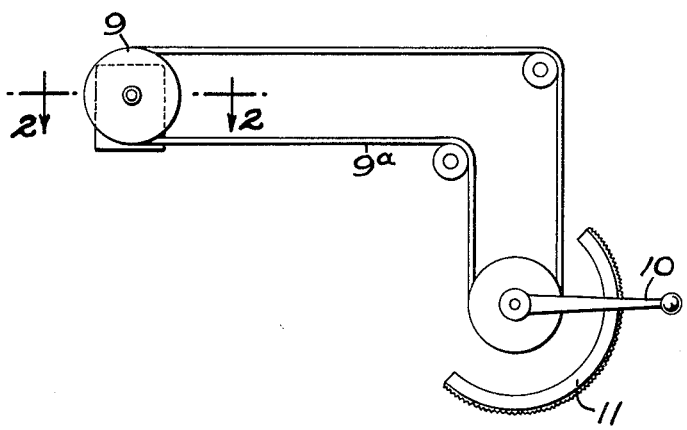
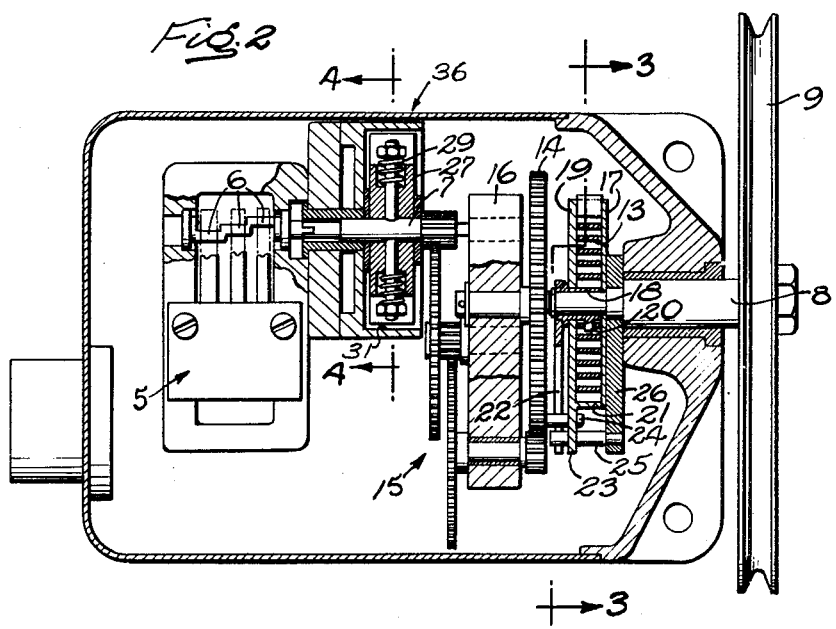
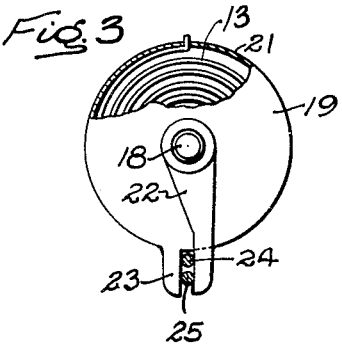
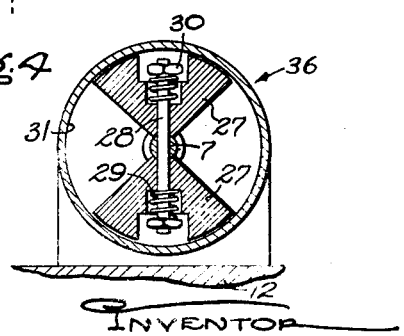
INVENTOR
George E. Sorensen Patented Sept. 12, 1950

2,521,759

UNITED STATES PATENT OFFICE 2,521,759

REVERSIBLE MOTION-TRANSMITTING MECHANISM

George E. Sorensen, Rockford, Ill., assignor to Woodward Governor Company, Rockford, Ill., a corporation of Illinois Application January 5, 1946, Serial No. 639,313

8 Claims. (Cl. 74—388)

1

The primary object of this invention is to provide a novel mechanism for converting the relatively short motion of a control element in either direction into an amplified and accurately measured motion of a driven part.

Another object is to provide a novel arrangement of stops for determining the extent of the transmitted motion.

A further object is to transmit the motion through the medium of a torsion spring while controlling the speed of the driven part.

The invention also resides in the novel structural arrangement of the parts for carrying out the foregoing objects.

Other objects and advantages of the invention will become apparent from the following detailed description taken in connection with the accompanying drawings, in which:

Figure 1 is an external end view of the improved mechanism illustrating one manner of actuating the same.

Fig. 2 is a sectional view taken along the line 2—2 of Fig. 1.

Figs. 3 and 4 are sectional views taken along the lines 3—3 and 4—4 respectively of Fig. 2.

The improved motion-transmitting mechanism is especially adapted for the actuation of an electrical transmitter 5 of a self-synchronous system by which motion may be transmitted accurately to a remote point. Transmitters of this type comprise a series of switches actuated in various combinations in the rotation of cams 6 on a shaft which is coupled to a shaft 7. In accordance with the present invention, the shaft 7 is rotated through a number of revolutions corresponding accurately to the extent of motion, either angular or rectilinear, of a control element which is adapted to be shifted selectively to different positions corresponding to those to which the driven part or shaft 7 is to be moved. In the embodiment shown, the various parts are adapted for angular or rotary motion instead of straight line motion, the control elements being in the form of a shaft 8. The latter is shown as carrying a pulley 9 connected through a cable 9ª to a manually operable lever 10 which is movable to different positions indicated on a segment 11. Suitable means acting frictionally on the lever is provided for holding the lever firmly in any position to which it is moved.

The control shaft 8 projects through and is journaled in one end wall of a casing 12 which houses the electrical transmitter 5 and the operating parts of the improved motion-transmitting mechanism. Generally stated, this mechanism comprises a power supplying device which, as permitted or controlled by movement of the control shaft 8 in either direction, imparts a precisely corresponding motion to the low speed gear 14 of a speed multiplying gearing 15 which drives the transmitter actuating shaft 7. The latter and the parts of the gearing 15 are mounted on a plate 16 secured to the bottom of the casing 12.

While the power supplying device may be a reversible electric motor, it is shown herein as a preloaded torsion spring 13 comprising a flat strip spirally coiled around the shaft 8 between one disk 17 on one end of a sleeve 18 and an axially spaced disk 19 which is loose on the sleeve. The inner end of the spring is secured at 20 to the sleeve which is loose on the reduced inner end of the shaft 8 while the outer end of the spring is secured to a drum or flange 21 rigid with the disk 19.

Fast on the inner end of the sleeve 18 is an arm 22 which projects outwardly beyond the periphery of the drum 21 from which a similar arm 23 projects outwardly. An angularly movable stop in the form of a pin 24 rigid with the gear 14 projects parallel to the shaft 8 in between the two arms 22 and 23. A second stop in the form of a pin 25 is carried by the outer end of an arm 26 fast on the control shaft 8, this pin projecting parallel to the pin 24 in between the arms 22 and 23. The circumferential thickness of the pins 24 and 25 is such that both are adapted for abutting engagement with the sides of both of the arms simultaneously.

By virtue of the preloading of the spring 13, the arms 22 and 23 are urged angularly toward each other, and this motion is limited by abutment of both arms with both of the pins 24 and 25 as shown in Fig. 3. Then, the position of the driven shaft 7 corresponds accurately with the position of the control shaft 8. Now, if the control shaft is turned clockwise, the arm 26 thereon is moved and the pin 25 on this arm moves the arm 23 away from the pin 24 and the arm 22. The force of the spring 13 then acts through the sleeve 18 and the arm 22 to turn the pin 24 and the gear 14 clockwise through an angular distance proportional to the movement of the control shaft 8 whereupon the pin 24 will encounter the pin 23 to arrest the motion of the gear. Thus, the driven shaft 7 is turned a corresponding distance comprising a plurality of revolutions determined by the multiplying ratio of the gearing 15.

Where, as in this instance, the power supplying device is in the form of a spring, it is desirable to provide means for regulating the speed of the driven shaft under the action of the spring so that this shaft will turn at a substantially constant speed. This means may be an escapement or other equivalent device, but preferably is a governor 36 which acts frictionally to limit the speed of the driven shaft. The governor comprises a pair of flyweights 27 slidably mounted for radial movement on opposite ends of a cross pin 28 on the shaft 7 and urged inwardly by compression springs 29 which are stressed according to the adjustment of nuts 30.

When the speed of the shaft 7 increases above a value predetermined by the stress of the springs, the flyweights frictionally engage the internal surface of a drum 31 stationarily mounted on the casing 12. The friction drag thus applied limits the speed of rotation of the shaft to the desired value because the centrifugally applied friction force is proportional to the speed of the shaft above the value at which engagement between the flyweights and the drum occurs.

If the shaft 8 is manually turned reversely, the driven shaft is rotated in a corresponding direction precisely in accordance with the extent of movement of the actuating shaft. In such a case, the arm 22 is turned counterclockwise with the pin 25 whereupon the arm 23 is actuated by the spring 31 to turn the pin 24 and the gear 14 so as to follow up the movement of the pin 25 and the control shaft at a speed determined by the action of the governor 36. This arm and therefore the driven shaft 7 are stopped when the pin 24 comes into abutment with the arm 22.

I claim as my invention:

1. Reversible motion-transmitting mechanism comprising two members each movable toward and away from the other, means constantly biasing said members toward each other, two independently movable stops adapted for abutting engagement with each of said members each being movable in either direction to different positions, means by which one of said stops may be moved selectively to different positions whereby to permit a corresponding follow-up movement of the other stop, motion-multiplying means actuated by said biasing means through the medium of said other stop, and a frictionally acting centrifugal governor operable to limit the speed of the high speed element of said motion-multiplying means.

2. Reversible motion-transmitting mechanism comprising two members each movable toward and away from the other, means constantly biasing said members toward each other, two independently movable stops adapted for abutting engagement with each of said members each being movable in either direction to different positions, means by which one of said stops may be moved selectively to different positions whereby to permit a corresponding follow-up movement of the other stop, motion-multiplying means actuated by said biasing means through the medium of said other stop, and means acting automatically to limit the speed of the high speed element of said motion-multiplying means and maintain operation of the latter at substantially constant speed during said follow-up movement.

3. Reversible motion-transmitting mechanism comprising two movable members, two stops adapted for abutting engagement with each of said members and each being mounted for independent movement, a spring means constantly urging said members angularly toward each other, a motion-multiplying gearing driven by one of said stops, means for selectively positioning the other stop, and means for maintaining a substantially uniform rate of rotation of the high speed element of said gearing.

4. Reversible motion-transmitting mechanism comprising two members each movable in opposite directions away from and toward each other, power actuated means for driving either one or the other of said members in opposite directions, two independently movable stops adapted for abutting engagement with both of said members to limit the motion of the members toward each other, manually controllable means for moving one of said stops and one of said members to selected positions away from the second stop and thereby initiate follow-up motion of the second stop and the other member, means for limiting the rate of said follow-up motion of said second stop whereby to permit said manually movable stop to be advanced a substantial distance ahead of said second stop, and a device to be actuated in unison with the motion of said second stop.

5. Reversible motion transmitting mechanism comprising two members each movable toward and away from each other, a spring having opposite ends connected to the respective members and acting in torsion to urge each member constantly toward the other member, two independently acting stops adapted for abutting engagement with each of said members and each being movable in either direction to different positions, manually controllable means for moving one of said stops to different selected positions, a device actuated by the other of said stops, and mechanism acting to limit the speed of motion of said device by said spring.

6. Reversible motion transmitting mechanism comprising two members each movable toward and away from each other, a spring having opposite ends connected to the respective members and acting in torsion to urge each member constantly toward the other member, two independently acting stops adapted for abutting engagement with each of said members and each being movable in either direction to different positions, manually controllable means by which one of said stops may be moved to different selected positions away from the other stop, a device actuated by the other of said stops when the latter moves under the influence of said spring to follow-up the motion of the manually controllable stop, coacting friction elements adapted when brought into gripping engagement with each other to restrain the motion of said device by said spring, and centrifugally acting means responsive to the speed of said device and operable to urge said friction elements together under a pressure proportional to said speed.

7. Reversible motion transmitting mechanism comprising two members each movable toward and away from each other, a spring having opposite ends connected to the respective members and acting in torsion to urge each member constantly toward the other member, two independently acting stops adapted for abutting engagement with each of said members and each being movable in either direction to different positions, manually controllable means by which one of said stops may be moved to different selected positions away from the other stop, a device actuated by the other of said stops when the latter moves under the influence of said spring to follow-up the motion of the manually controllable stop, means variably operable to exert a force opposing the motion of said device by said spring, and means automatically responsive to changes in the speed of said device to increase and decrease said restraining force as the speed of said device increases and decreases respectively.

8. Reversible motion transmitting mechanism comprising two members each movable toward and away from each other, a spring having opposite ends connected to the respective members and acting in torsion to urge each member constantly toward the other member, two independently acting stops adapted for abutting engagement with each of said members and each being movable in either direction to different positions, manually controllable means by which one of said stops may be moved to different selected positions away from the other stop, a device actuated by the other of said stops when the latter moves under the influence of said spring to follow-up the motion of the manually controllable stop, and an automatic speed regulator acting on said device to restrain the motion thereof by said spring and limit the speed of movement of the device to a predetermined value.

GEORGE E. SORENSEN.

REFERENCES CITED

The following references are of record in the file of this patent:

UNITED STATES PATENTS

| Number | Name | Date |
| --- | --- | --- |
| 2,031,608 | Kiel | Feb. 25, 1936 |
| 2,246,050 | Leishman | June 17, 1941 |
| 2,336,307 | Slye | Dec. 7, 1943 |
| 2,336,425 | Shenton | Dec. 7, 1943 |
| 2,408,274 | Schleicher | Sept. 24, 1946 |